United States Patent [19]
Yasushi

[11] Patent Number: 5,244,026
[45] Date of Patent: Sep. 14, 1993

[54] MULTIPLE TIRES ON A SINGLE WHEEL

[76] Inventor: Ozaki Yasushi, 25-16, Tokumaru 7-chome, Itabashi-ku, Tokyo, Japan

[21] Appl. No.: 788,202

[22] Filed: Nov. 5, 1991

[30] Foreign Application Priority Data

Jun. 18, 1991 [JP] Japan ................... 3-174303

[51] Int. Cl.$^5$ ............... B60C 23/02; B60C 29/00
[52] U.S. Cl. .................. 152/415; 152/450; 137/493.9
[58] Field of Search ........... 152/450, 454, 415, 418, 152/427; 137/516.25, 493.9

[56] References Cited

U.S. PATENT DOCUMENTS

| | | | |
|---|---|---|---|
| 1,134,701 | 4/1915 | Seeberger | 152/415 |
| 1,335,711 | 3/1920 | Takovleff | 152/415 |
| 2,463,335 | 3/1949 | Warnshuis et al. | 152/415 |
| 3,760,859 | 9/1973 | Shahan et al. | 152/415 |
| 4,033,375 | 7/1977 | Hirsch | 137/493.9 |
| 4,562,861 | 1/1986 | Payton | 137/493.9 |
| 5,048,561 | 9/1991 | Taplin | 137/493.9 |

FOREIGN PATENT DOCUMENTS 0814148 5/1959 United Kingdom .............. 152/427

*Primary Examiner*—Caleb Weston
*Assistant Examiner*—Nancy T. Krawczyk
*Attorney, Agent, or Firm*—Thomas R. Morrison

[57] ABSTRACT

This invention relates to a combination of multiple tires disposed adjacently parallel to each other on a single wheel, respective inner spaces of the multiple tires being communicated with each other by way of an airflow piping. The airflow piping comprises a pneumatic pressure control valve which can be opened or closed due to an air-leaking condition of the multiple tires. When one of the multiple tires leaks air rapidly, the pneumatic pressure of the other normal tire is also decreased, thereby allowing the driver to notice the puncture. If the former leaks air slowly, its air is supplied by the latter, respective pneumatic pressures are going to become equal, thereby the driver can drive for a certain time and be free from any serious accident that may occur when he is unaware of the puncture.

7 Claims, 8 Drawing Sheets

MULTIPLE TIRES ON A SINGLE WHEEL

BACKGROUND OF THE INVENTION

1. Field of the Invention

This invention relates to multiple tires disposed in parallel with each other on an outer periphery of a single wheel, which have superior safety and operability, and particularly multiple tires which communicate with each other by way of an airflow piping inserted into an internal space of each tire. Further, the airflow piping comprises a pneumatic pressure control valve which is effective either opened or closed due to an air-leaking condition in the multiple tires.

2. Description of the Prior Art

FIG. 12 shows a section view of a single pneumatic tire 3 for a vehicle, which is mounted on a rim 2 of a wheel 1. In FIG. 13, there is shown a section view of two tires 3, 3 which are in parallel with each other mounted on two rims 2a, 2b of single wheel 1. This technique is disclosed in Japanese Laid-open Patent Publication No. 60-12303. It was developed specifically for a sports car to overcome the disadvantages of a single tire having a larger width. The two tires have a good water repelling properties, less contact area for ground, less vibration and more stability when driven. In addition, even if one tire blows out, the driver can drive the car using the other normal tire without coming to a stop.

However, when one tire leaks air gradually, the driver drives without becoming aware of it. In particular, the car can travel almost normally when driving straight. Moreover, even though an inner tire leaks air, it is very difficult to watch its condition from the outside. Yet, when the driver goes around a curve at a high speed so that one of the tires leaks air, a serious accident may occur because the car's center of gravity is in disorder. The technical concept of the multiple tires is interesting, but they are not widely used due to of safety.

OBJECTS AND SUMMARY OF THE INVENTION

It is therefore a general object of this invention to provide multiple tires on a single wheel, which enable the driver to become easily aware of an air leak in a tire, thereby enabling safe driving at a slow speed.

To achieve this object, the present inventor has studied how the driver can notice an air leak, particularly in an inner tire in the multiple tires. Conventionally, the concept that, even though one of the multiple tires gets punctured, the driver can drive his car with the other normal tire has been considered as the best advantage of the multiple tires. Then, he has conceived it to be a good idea to communicate respective inner spaces of the multiple tires with each other by way of an airflow piping. Namely, when one tire leaks air, the pneumatic pressure of the other one is decreased due to the airflow from the former to the latter, the driver can then notice the puncture easily. When the former leaks air slowly, it is supplied air from the other normal tire, thereby respective pneumatic pressures of both tires are going to become equal. Thus, the driver can drive slowly to some extent and is entirely free from standstill. Since the airflow piping has the pneumatic pressure control valve which can be opened or closed due to leaking air in the multiple tires, the present invention can enjoy remarkable advantages and conveniences.

The above, and other objects, features and advantages of this invention will become apparent from the following description read in conjunction with the accompanying drawings.

DETAILED DESCRIPTION OF THE PREFERRED EMBODIMENTS

Figure 1:
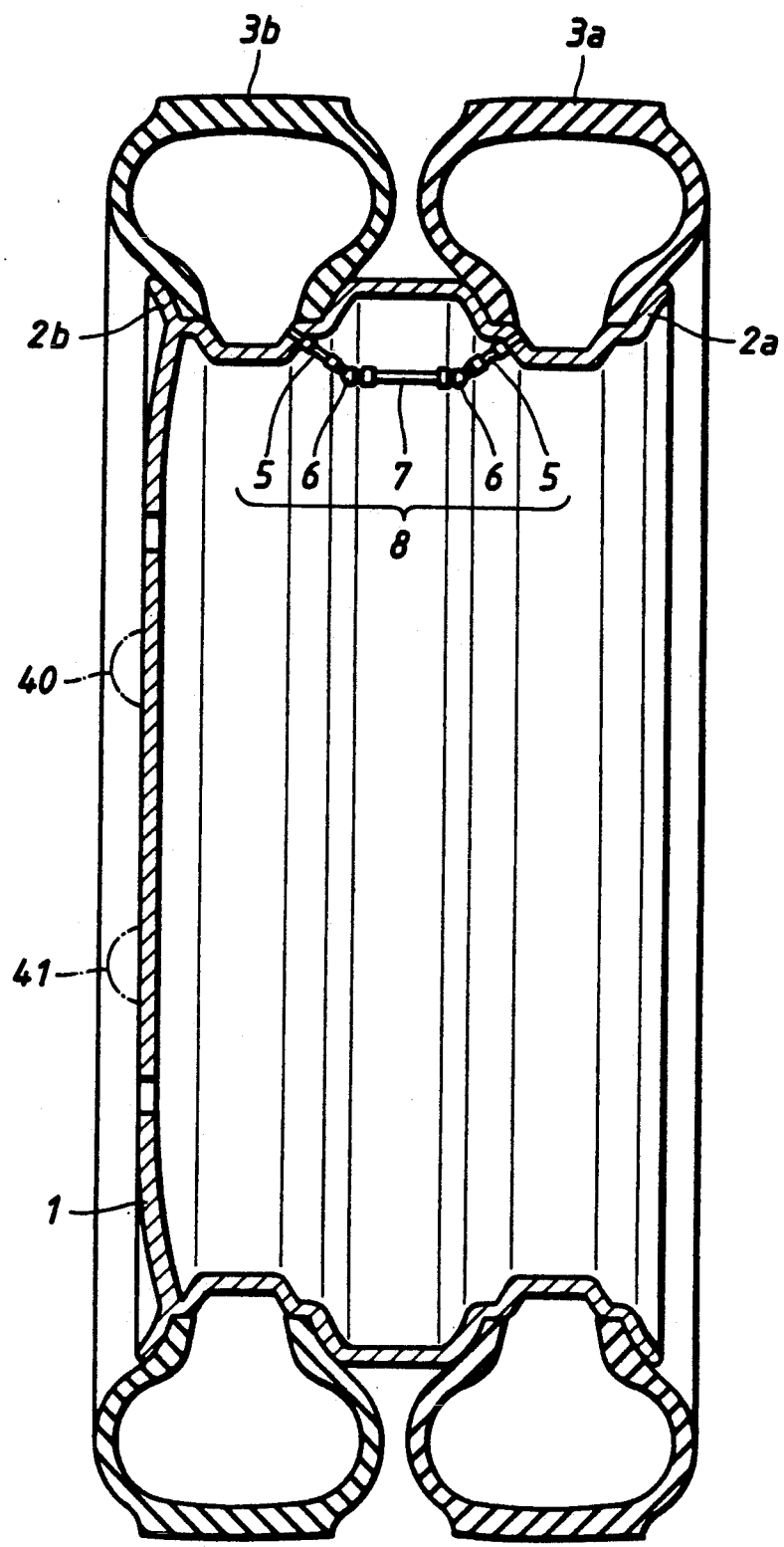
FIG. 1 is a section view of an embodiment of multiple tires according to this invention.

Referring first to FIG. 1, a first rim 2a and a second rim 2b are integrally formed in a parallel configuration on an outer periphery of a single wheel 1. Two tires i.e. a first tire 3a and a second tire 3b are respectively disposed on first rim 2a and second rim 3b. An airflow piping 8 is, in a bent configuration, communicated with respective inner spaces of first and second tires 3a, 3b. It comprises two separate connectors 5, 5 at both sides, two separate joints 6, 6 thereadjacent and a pneumatic pressure control valve 7 between two joints 6, 6.

Figure 2:
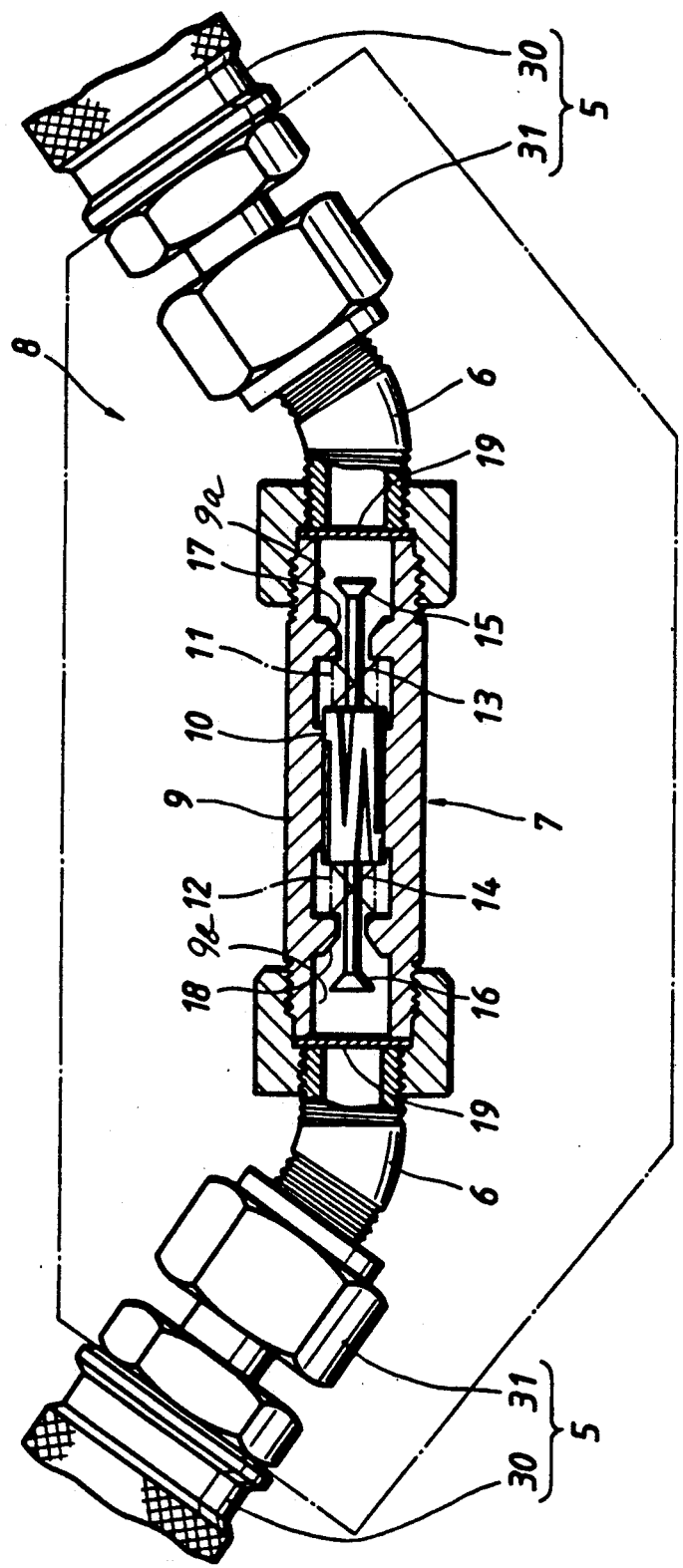
FIG. 2 is an enlarged section view of a pneumatic pressure valve in the foregoing embodiment.

As shown in FIG. 2, pneumatic control valve 7 comprises a cylindrical housing 9, a cylindrical valve body 10 slidable axially in an internal space of housing 9, a pair of springs 11, 12 for pressing valve body 10 equally from form in leftside and rightside directions. A pair of elongated bars 13, 14 having respective flanges 15, 16 are extended from both left and right sides of valve body 10. Two flanges 15, 15 can be engaged with a pair of protrusions 17, 18 protruded from an inner wall of housing 9. Further, a pair of filters 19, 19 are disposed between both ends of housing 9 and of joints 6, 6 in order to prevent any dust in multiple tires 3a, 3b from penetrating into the internal space of housing 9.

Figure 3:
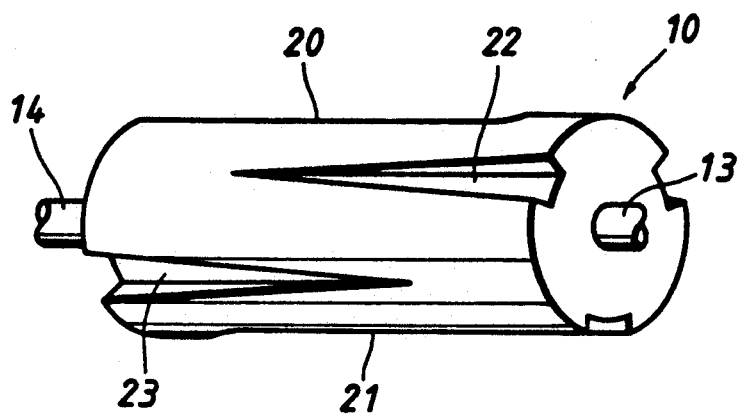
FIG. 3 is a perspective view of a valve body to be used for the pneumatic pressure control valve.

As shown in FIG. 3, valve body 10 incorporated in control valve 7 includes six tapered grooves 20, 21, 22, 23 extending axially on a surface of valve body 10. Two more grooves (not illustrated) are disposed on a back surface of valve body 10. Upper groove 20 is extended from a leftside end of valve body 10, but does not reach a rightside end thereof. Lower groove 21 is extended from a rightside end of valve body 10, but does not reach a leftside end thereof. Groove 22 is formed in the same way as in groove 21, but its width becomes narrower and shallower as groove 22 extends in a leftward direction. Further, groove 23 is formed in the same way as in groove 20, but its width becomes narrower and shallower as groove 23 extends in a right direction.

A function of pneumatic pressure control valve 7 will now be described.

When leftside and rightside tires 3a, 3b are without any air leakage, the pneumatic pressure of both tires is the same. Accordingly, valve body 10 is, as shown in FIG. 2, positioned in the center of housing 9 since it is pressed equally from leftside and rightside directions. Under these conditions, six grooves including 20 to 23 on the surface of valve body 10 are not extended to spaces 9a, 9b in housing 9, so that passage between two tires 3a, 3b is blocked effectively.

Figure 4:
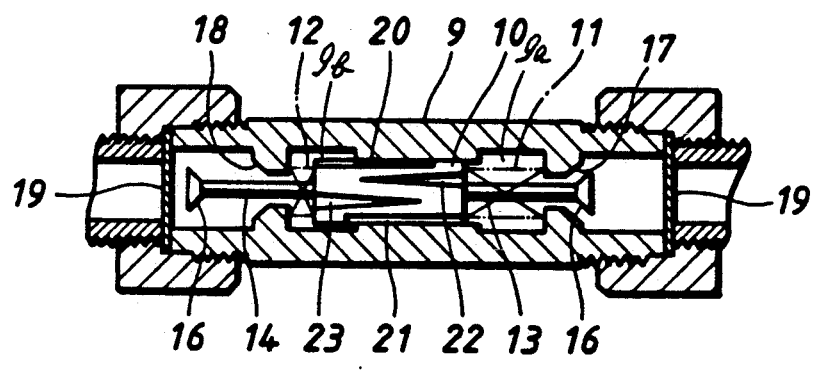
FIGS. 4 and 5 respectively are a section view for describing the operating condition of the pneumatic pressure control valve.

However, when air begins to leak from tire 3b, valve body 10 is, as shown in FIG. 4, pressed from right to left, since the pneumatic pressure of normal tire 3a is higher than that of air-leaked tire 3b. In this case, grooves 21, 22 and one more groove on the backside of valve body 10 are forced to be communicated with leftside space 9b in housing 9, so that the air in rightside tire 3a flows gradually into rightside tire 3b, and two tires 3a, 3b are depressed. Thus, it is easy for the driver to notice the puncture.

Figure 5:
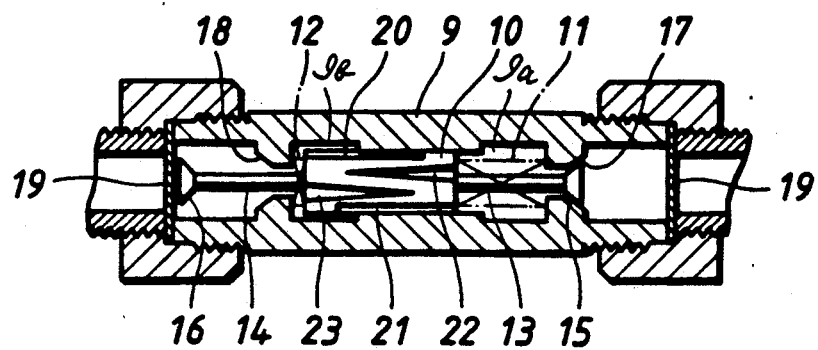

When tire 3b gets punctured rapidly and depressed, the difference between the respective pneumatic pressures of two tires 3a, 3b becomes larger, so that valve body 10 is, as shown in FIG. 5, moved in a leftside direction largely. In this case, flange 16 of rightside elongated bar 14 is engaged with protrusion 17, thereby space 9a is sealed. Then, the pneumatic pressure of normal tire 3a becomes slightly lower, and the driver can notice occurrence of the puncture. Since the air leakage of tire 3a is slight, driving may occur.

Figure 6:
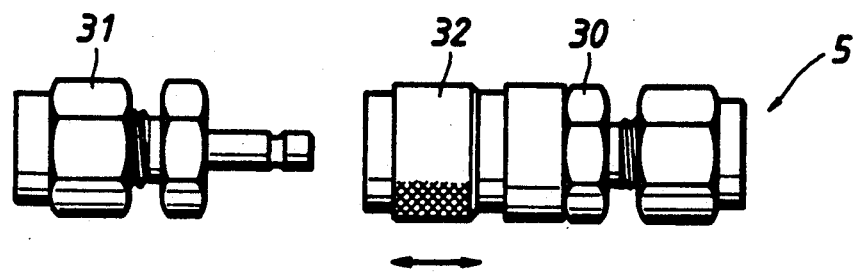
FIG. 6 is a view of a connector to be disposed in the pneumatic control valve.
Figure 7:
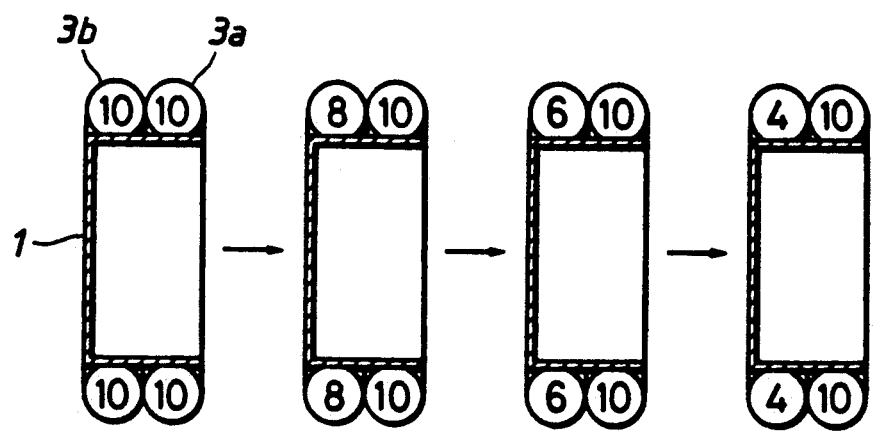
FIG. 7 is a schematic chart of an air decrease in case one of the conventional multiple tires is punctured. p

As shown in FIG. 6, connector 5 comprises two separate members, a main member 30 and an additional member 31, which is effective to connect both sides of pneumatic pressure control valve 7 to the interior of respective tires 3a, 3b. Both members 30, 31 can be connected to each other or disconnected from each other by sliding a sleeve 32 fixed with main member 31, as shown by an arrow in FIG. 6. Accordingly, a dash-and-dot line portion, namely, airflow piping 8 in FIG. 2 can be removed by a simple finger operation of sleeve 32. When it is removed, a passage of main member 30 is closed, so that rightside tire 3a and leftside tire 3b are independent from each other. If the driver becomes aware of the puncture due to reduction of the pneumatic pressure of tires 3a, 3b, he or she can stop the car immediately, and remove airflow piping 8 by operating connectors 5, 5. Thus, it is possible to prevent normal tire 3a from leaking air, and then replace punctured tire 3b with a new tire.

According to this invention, the airflow between two tires 3a, 3b is predetermined with a suitable rate which will be described hereinafter.

For example, if tire 3b gets punctured, it is assumed that each of two tires 3a, 3b is fully filled with air at the rate of 10 and the air in punctured tire 3b is being leaked at the rate of 2 per hour. According to conventional multiple tires having no air communication between them, as shown in a schematic airflow chart, the air in tire 3b is being leaked at the rate of 2 per hour, but tire 3a is normal and not affected at all by tire 3b, so that the driver can continue to drive the car without becoming aware of the puncture of the tire 3b. Yet, when the driver goes around a curve at a high speed, there is growing a danger that a serious accident may occur.

Figure 8:
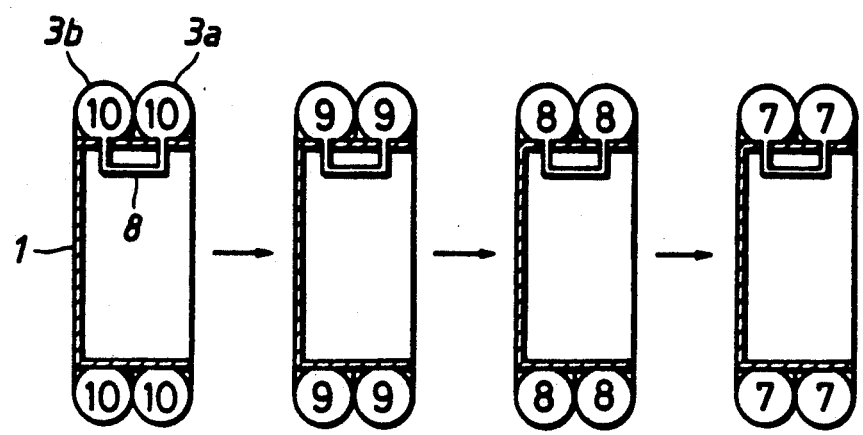
FIG. 8 is a schematic chart of an air decrease in case the multiple tires according to his invention is punctured.

To solve this danger, this invention is provided with airflow piping 8 enabling a certain air communication between two tires 3a, 3b, in which as soon as tire 3b gets punctured, the air in normal tire 3a is supplied into punctured tire 3b, thereby the air quantity of both tires 3a, 3b is diminished at substantially same rate as shown in FIG. 8. Namely, both tires are being depressed equally as if one tire is depressed. Accordingly, the driver can get rid of the foregoing danger by maintaining a low-speed driving for a period of time. However, it is difficult for the driver to notice which tire got punctured. Further, when replacing punctured tire 3b with a new tire, the problem is that tire 3a also must be fully filled with air.

Figure 9:
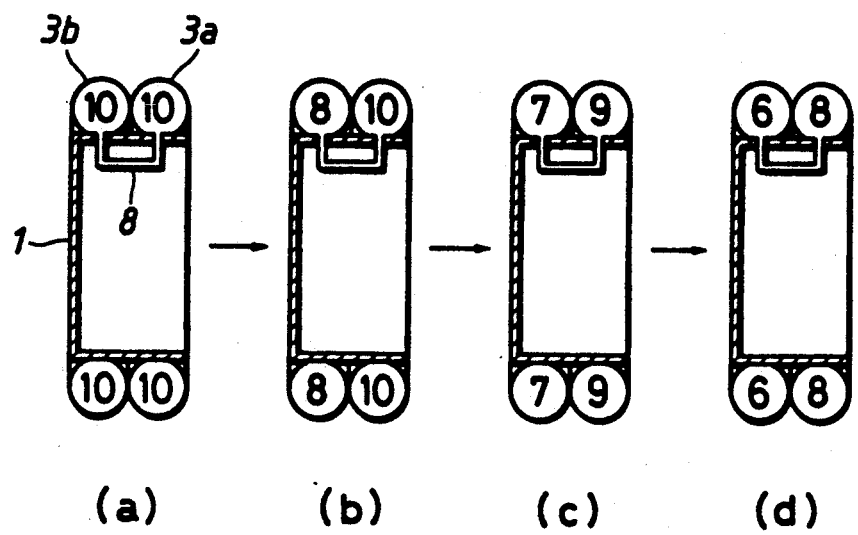
FIG. 9 is a schematic chart of an air decrease in case the multiple tires according to this invention gets punctured.
Figure 10:
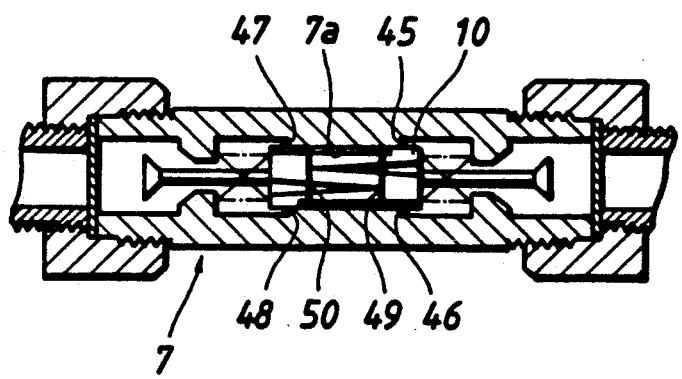
FIG. 10 is a section view of a further embodiment of the pneumatic pressure control valve.
Figure 11:
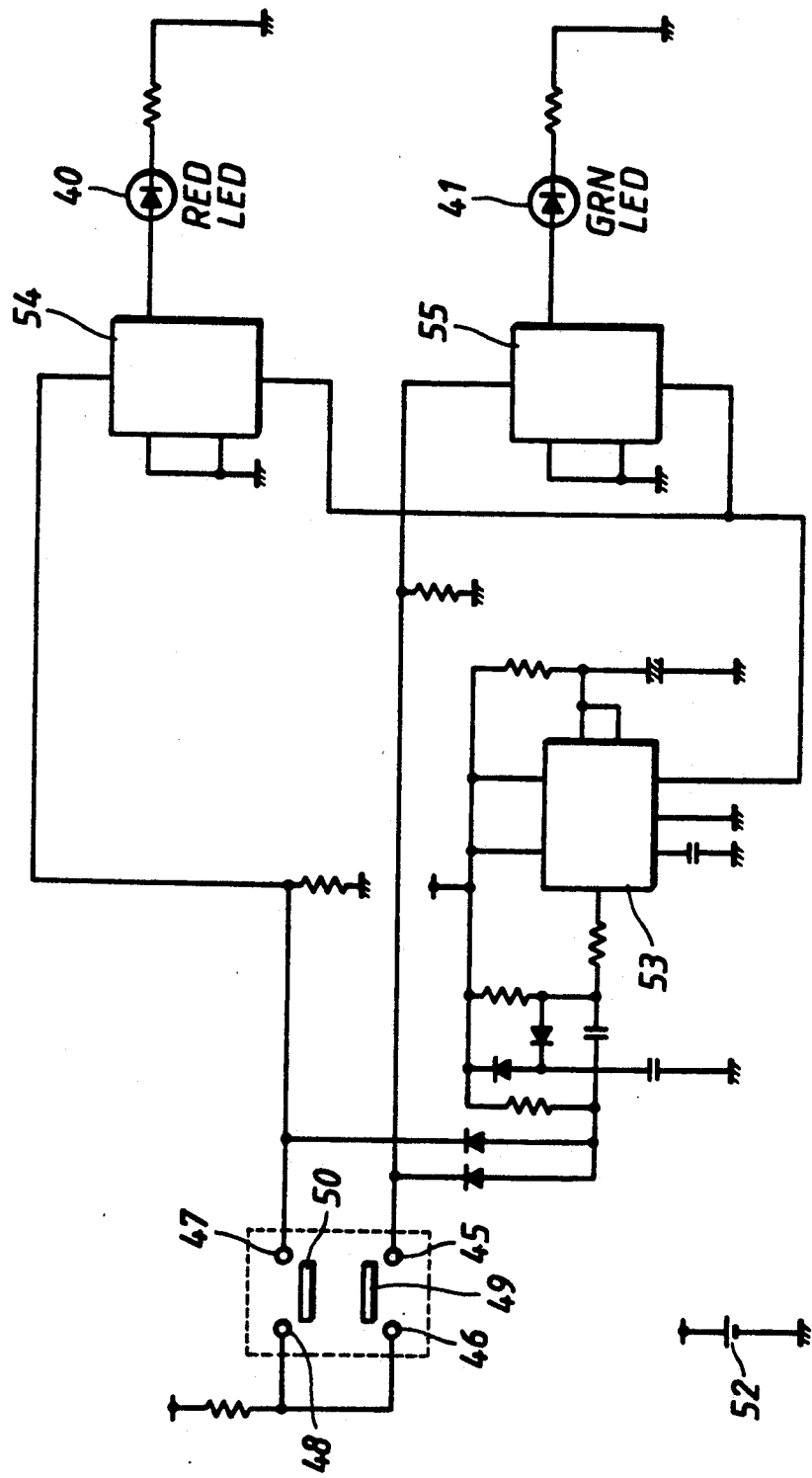
FIG. 11 is an electric circuit to be used for the foregoing embodiment.
Figure 12:
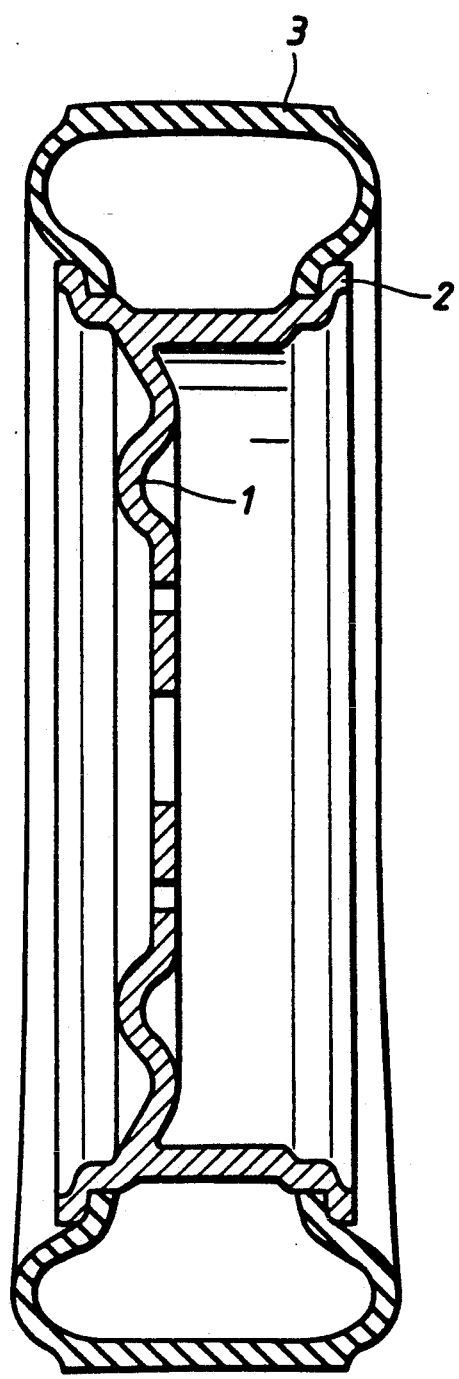
FIG. 12 is a section view of a general single tire.
Figure 13:
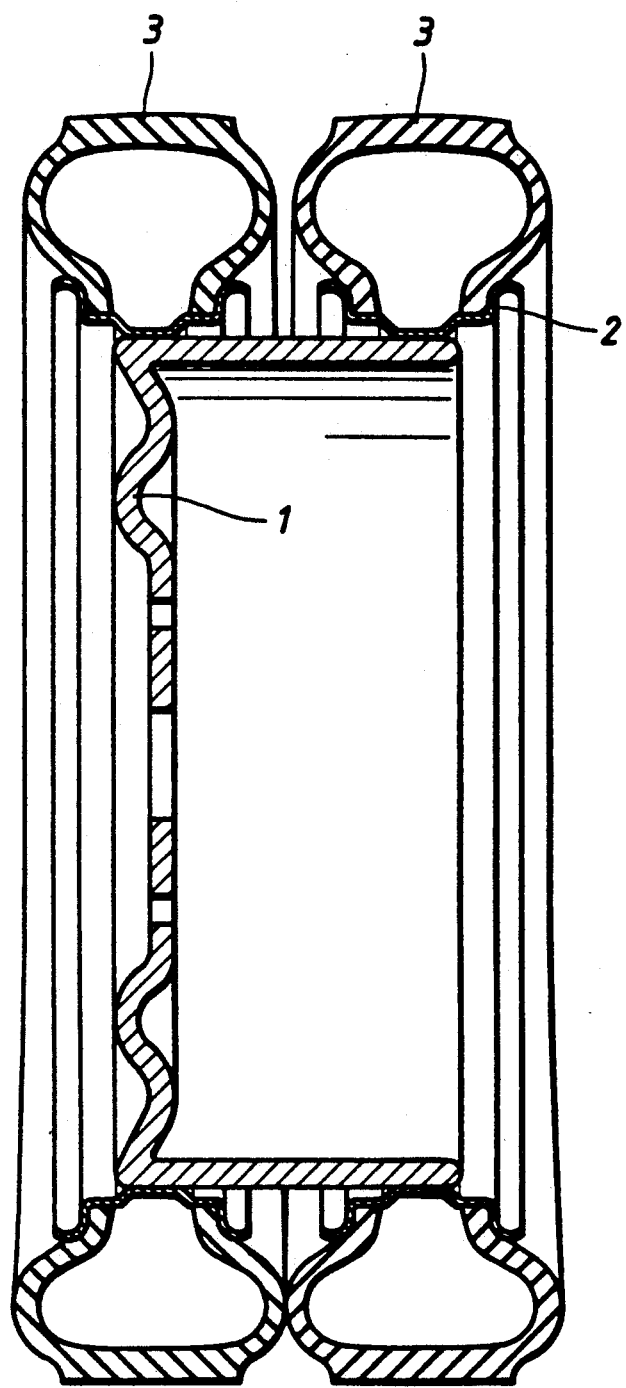
FIG. 13 is a section view of conventional multiple tires.

To overcome this problem, preferably the air leakage of tire 3a is predetermined to be less than that of punctured tire 3b, so that the depressing progress of the former is later than that of the latter. FIG. 9 shows a schematic chart of a gradual air leakage. Thus, as shown in this figure, the driver can drive the car relatively longer owing to normal tire 3a. In this case, tire 3a is depressed gradually, so that the driver can become aware of the puncture well before the occurrence of such a serious accident as discussed above.

To realize the gradual air leakage as shown in FIG. 9, the airflow rate flowing between both tires 3a, 3b is preferably predetermined to be from 0.01 to 12 liters per minute. Of course, it may be adjusted in accordance with respective diameters of components 5, 6, 7 as well as respective shapes or depths of grooves 20 to 23 of valve body 10.

The width of respective grooves 21, 23 disposed on the surface of valve body 10 is formed narrower and shallower in an axial direction. Namely, the larger the difference between respective pneumatic pressures of two tires, the higher the airflow rate flowing between two tires. Yet, it is not always necessary to increase or decrease the airflow rate based on the difference between the pneumatic pressures. Namely, safe driving to some extent is available due to the airflow between two tires without disposing pneumatic control valve 7.

In order for the driver to notice at once which one of two tires 3a, 3b gets punctured, two different colored lamps 40, 41 as depicted by a dash-and-dot line may be disposed on the outer side of wheel 1. For example, when tire 3b gets punctured or air-leaked, first lamp 40 (for example, red color) may light, while when second lamp 41 (for example, green color) may light, so that which tire gets punctured can be noticed easily by the driver's eyes. Lamps 40, 41 can be switched on by making use of switching means disposed in valve body 10 of control valve 7.

More specifically, a plurality of terminals 45 to 48 are disposed on both sides of an inner periphery 7a of control valve 7, on which periphery valve body 10 is slidable. Further, two electrically conductive annular members 49, 50 are disposed on the surface of valve body 10. In this case, control valve 7 as well as valve body 10 must be made of a non-conductive material such as resin or the like. When a certain difference between respective pneumatic pressures of both tires 3a, 3b occurs, valve body 10 is moved left or right, thereby terminals 45, 46 are engaged with conductive member 49 or terminals 47, 48 are engaged with conductive member 50. Then, either light emitting diode of lamps 40, 41 disposed on a circuit in FIG. 1 is switched on. After that, even though the position of valve body 10 is moved, either one of lighting lamps is predetermined to keep an ON condition. Numeral 52 denotes a battery, numeral 53 a timer semiconductor and numeral 54, 55 semiconductors for maintaining a condition.

It is of course to be understood that this invention is not limited to two tires disposed on a single wheel, but may be applied to three tires or more, in which the same object and functions are attainable.

As discussed above, when either one of two or more tires gets punctured rapidly, the pneumatic pressure of the other one is also decreased due to air-leaking progress of the punctured tire. Accordingly, the driver can notice the puncture likewise in a usual car having a combination of a single tire.

When one of two or more tires slowly leaks air, it is air-supplied by the other normal tire, thereby the pneumatic pressure of respective tires is going to become equal. Thus, a slow speed driving to some extent is available. The driver is therefore entirely free from any serious accident that may occur without becoming unaware of the puncture and also free from standstill. Further, because of the multiple tires, the driver can enjoy stable driving, as well as a good water repelling properties. Still further, since the pneumatic pressure control valve is opened or closed in accordance with the air-leaking condition, the multiple tires can be protected safely.

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A combination of multiple tires comprising:
   at least first and second tires disposed adjacent and parallel to each other on a single wheel;
   means for communicating respective internal spaces of said at least first and second tires by way of an airflow piping;
   said airflow piping including a pneumatic pressure control valve;
   means for maintaining said control valve in a closed position when a pneumatic pressure of each of said multiple tires is equal;
   said means for maintaining operating to open said control valve when a difference between respective pneumatic pressures of multiple tires exceeds a first predetermined value;
   said means for maintaining operating to open said control valve more when said difference between respective pneumatic pressures becomes larger;
   said means for maintaining operating to close said control valve when said difference between respective pneumatic pressures exceeds a second predetermined value;
   said control valve includes a valve body slidable axially in a cylindrical housing;
   a pair of springs press said valve body equally from leftside and rightside directions;
   each of said pair of springs have a bar elongated from respective sides of said valve;
   said bar has a flange at its end; and
   each said flange engages a protrusion formed on an internal wall of said housing to block an air passage of said airflow piping.

2. A combination of multiple tires as claimed in claim 1, in which said valve body is cylindrical and a plurality of grooves are axially tapered alternately upon a surface of said cylindrical valve body with a certain space, and each groove is extended from a side end of said valve body and does not reach the other side end thereof.

3. A combination of multiple tires as claimed in claim 1, in which both said pneumatic pressure control valve and said valve body are made of a non-conductive material.

4. A combination of multiple tires as claimed in claim 1, in which a plurality of terminals are disposed on both ends of an inner periphery of said control valve and a pair of annular conductive members are disposed on a periphery of valve body.

5. A wheel and tire assembly comprising:
   a single wheel;
   a plurality of tires disposed adjacent and parallel to each other on said single wheel;
   said adjacent tires having respective internal spaces;
   said internal spaces being communicated with each other by way of airflow piping;
   said airflow piping comprising a pneumatic pressure control valve;
   means for maintaining said control valve in a closed position when a pneumatic pressure of each of said multiple tires is equal;
   said means for maintaining operating to open said control valve when a difference between respective pneumatic pressures of multiple tires exceeds a first predetermined value;
   said means for maintaining operating to open said control valve more when said difference between respective pneumatic pressures becomes larger; and
   said means for maintaining operating to close said control valve when said difference between respective pneumatic pressures exceeds a second predetermined value;
   said control valve including a valve body slidable axially in a cylindrical housing;
   said valve body has a plurality of grooves axially tapered alternately upon a surface of said valve body; and
   each of said plurality of grooves is extended from each of a side end of said valve body and does not reach an other side end of said valve body.

6. A wheel and tire assembly comprising:
   a single wheel;
   at least first and second tires on said wheel;
   means for communicating internal spaces of said first and second tires;
   said means for communicating including a control valve;
   said control valve includes a valve body;
   said valve body has a plurality of axially tapered grooves located on each of an end of said valve body;
   means for moving said control valve, effective to open said control valve, when there are pressure differences in said internal spaces; and
   said means for moving said control valve, effective to close said control valve, when said pressure differences exceed a predetermined value.

7. A wheel and tire assembly according to claim 6, wherein said single wheel has a plurality of lamps to indicate which of said at least first and second tires is leaking.

* * * * *